United States Patent [19]
Leary

[11] Patent Number: 6,061,969
[45] Date of Patent: May 16, 2000

[54] INFLATABLE GREENHOUSE

[76] Inventor: Jeremiah E. Leary, 707 Mount Mariah Dr., Cincinati, Ohio 45245

[21] Appl. No.: 09/022,073

[22] Filed: Feb. 11, 1998

Related U.S. Application Data

[60] Provisional application No. 60/036,962, Feb. 11, 1997.

[51] Int. Cl.[7] ............................................. E04B 1/345
[52] U.S. Cl. ............................................. 52/2.11; 52/2.18
[58] Field of Search ............................ 52/2.11, 2.17,
52/2.18, 2.22, 2.23, 2.24, 80.1, 80.2, 81.1,
83, 173.1; 47/17, 32.1; 135/87, 104, 121,
906; 446/4, 478

[56] References Cited

U.S. PATENT DOCUMENTS

| | | | |
|---|---|---|---|
| 3,877,084 | 4/1975 | Johnson | 52/2.1 |
| 4,000,749 | 1/1977 | Busco | 52/2.1 |
| 4,651,360 | 3/1987 | Wang | 4/506 |
| 5,115,998 | 5/1992 | Olive | 52/2.23 X |
| 5,471,797 | 12/1995 | Murphy | 52/2.17 |
| 5,487,400 | 1/1996 | Dawkins | 135/87 |

*Primary Examiner*—Beth Aubrey
*Attorney, Agent, or Firm*—James J. Leary; Carol D. Titus

[57] ABSTRACT

The inflatable greenhouse is an approximately hemispherical dome-shaped inflatable structure which is entirely self-supporting when inflated. The greenhouse has a double-walled structure of plastic sheet material which gives the greenhouse structural rigidity when inflated and which increases the thermal protection provided by the greenhouse. The walls of the greenhouse are made of a transparent or translucent plastic material to allow optimal light transmission for photosynthetic plants or of a light filtering or opaque plastic material for light-sensitive plants and animals. The greenhouse has an access door through the wall to allow easy access to the interior of the structure. The door is placed such that it does not interrupt the structural integrity of the inflated dome-shaped structure, therefore no rigid structural members are needed to support the walls. The slit-shaped access door is equipped with a slide fastener that can be opened from the top or the bottom so that the door can be used for ventilating the interior of the greenhouse as well as for interior access. The inflatable greenhouse has a lower ring which is separately inflatable with a dense medium, such as water, for stabilizing and anchoring the greenhouse against movement by wind or storms.

13 Claims, 2 Drawing Sheets

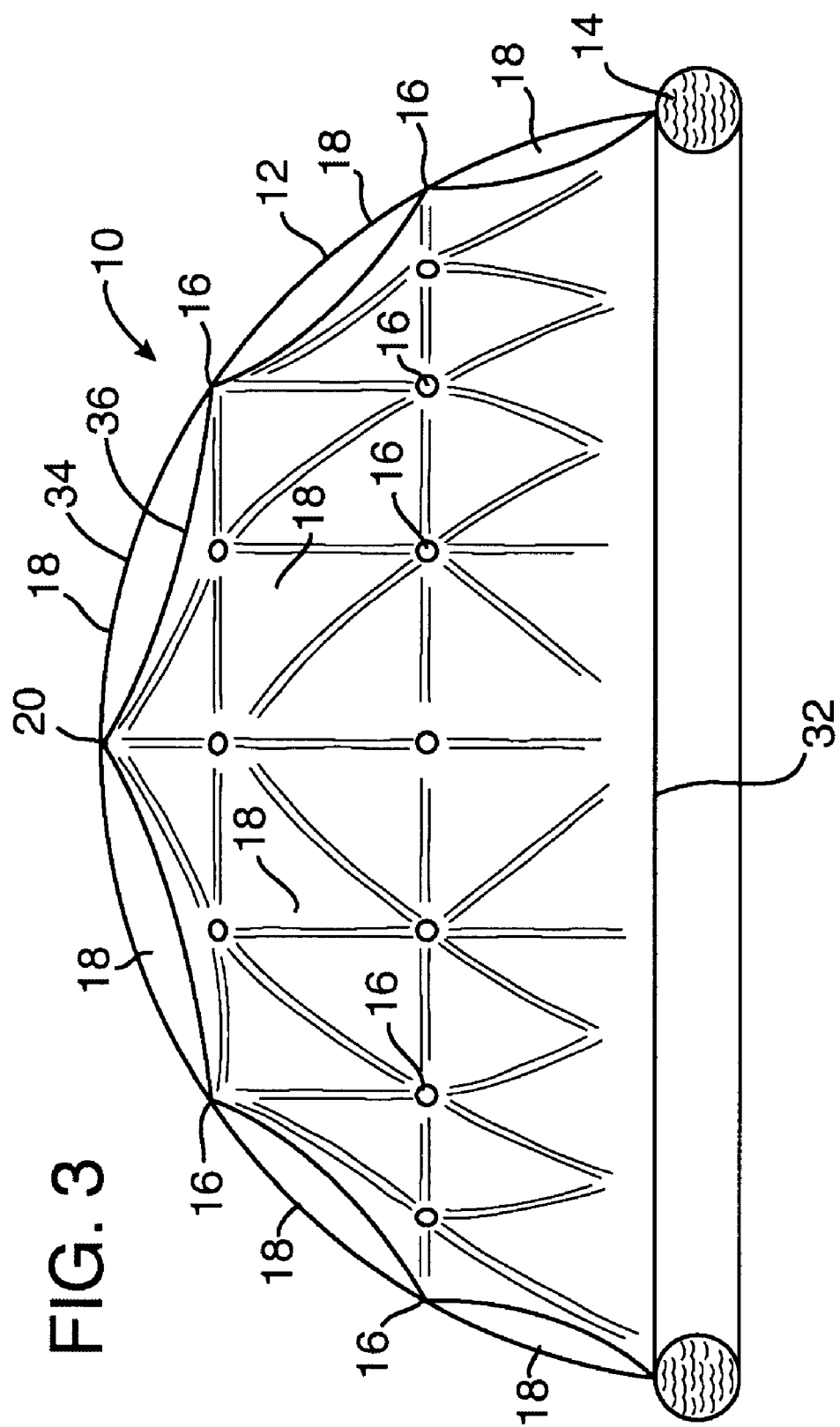

INFLATABLE GREENHOUSE

CROSS REFERENCE TO OTHER APPLICATIONS

This application claims the benefit of U.S. Provisional Patent Application Ser. No. 60/036,962 filed Feb. 11, 1997.

FIELD OF THE INVENTION

The present invention relates generally to an inflatable building structure. More particularly, it relates to a dome-shaped inflatable greenhouse for cultivating and protecting plants or animals.

BACKGROUND OF THE INVENTION

Inflatable building structures, including various dome-shaped inflatable building structures are known in the prior art. For example:

U.S. Pat. No. 4,164,829 for an INFLATABLE STRUCTURE describes an inflatable dome-shaped structure which is held up by internal air pressure. This structure depends on internal air pressure for support, therefore it cannot be ventilated unless it has a constant supply of pressurized air, which would make it unsuitable for use as a greenhouse for plants.

U.S. Pat. No. 4,876,829 for an INFLATABLE TENT STRUCTURE describes a dome-shaped tent having an external supporting framework of elongated inflatable tubes which interconnect at the apex of the tent. U.S. Pat. No. 5,007,212 for an INFLATABLE SHELTER describes a similar dome-shaped tent having a ring-shaped inflatable, tubular base and inflatable, tubular support ribs converging near the apex of the tent to hold up the tent walls. The inflatable tent structures described in these two patents are single-walled structures which would not provide very much insulative protection for use as a greenhouse for plants. Because these structures are intended for use as camping tents, the walls of the structures are in large part opaque, which also makes them unsuitable for use as a greenhouse for plants.

U.S. Pat. No. 4,807,405 for a GEODESIC INFLATABLE STRUCTURE AND METHODS OF UTILIZING SAME describes a dome-shaped structure having a lattice-like support framework of inflatable tubular ribs and triangular inflatable panels between the ribs. This patent describes a very complex structure, requiring many, many linear welding seals to form the lattice-like support framework and the triangular inflatable panels. The complexity of this structure would undoubtedly make it expensive to produce.

U.S. Pat. No. 4,384,435 for an INFLATABLE TENT describes an inflatable hemispherical tent having multiple compartments in the shape of orange sections. The inflatable compartments are interconnected at the top of the tent by a manifold. The construction of the inflatable compartments in this structure requires several long, curved welding seals between the marginal edges of each section and between the edges of each section and the internal walls that separate the compartments. This is a complex and potentially expensive manufacturing process.

U.S. Pat. No. 4,583,330 for a MODULAR INFLATABLE DOME STRUCTURE describes a dome-shaped structure having a modular support framework formed of uniform length inflatable tubes which are joined together by uniform Y-joints. The inflatable support framework hardens by vulcanization after inflation to form a permanent structure. The permanency of the vulcanized framework would make this structure unsuitable for use as a temporary greenhouse for plants.

In addition, inflatable greenhouses are known in the prior art. For example:

U.S. Pat. No. 4,027,437 for an INFLATABLE BUILDING describes a rectangular inflatable structure which is adapted for use as a greenhouse for plants. The inflatable structure is not self-supporting, but it requires a separate rigid framework for holding up the inflatable tubes which make up the walls of the structure.

U.S. Pat. No. 5,433,030 for a PLANT PROTECTOR describes a cylindrical inflatable greenhouse for plants with a doorway through the cylindrical wall. The walls of the inflatable cylindrical structure are constructed with multiple interconnected horizontal rings formed by long welded seams which encircle the structure. An opaque lower ring is separately inflatable with water to act as a ballast for the structure. The long multiple welded seams between the rings would add to the manufacturing cost of the structure. In addition, the inflatable structure is not totally self-supporting. The doorway of the structure must be reinforced with a rigid material, such as wood, to prevent the structure from deforming.

None of the prior art inflatable shelters or buildings provides a totally self-supporting dome-shaped inflatable structure, which does not require any rigid support members, is inexpensive to manufacture, and provides sufficient light transmission, thermal protection, ventilation and interior access to make it suitable for use as a temporary greenhouse structure.

SUMMARY OF THE INVENTION

In keeping with the foregoing discussion, the object of the present invention is to provide a dome-shaped inflatable structure which is suitable for use as a portable or temporary greenhouse for cultivating and protecting plants or animals. In one aspect of the invention, in order to make the inflatable structure suitable for use as a greenhouse for photosynthetic plants, the walls of the structure are transparent or translucent to allow sufficient light transmission at the wavelengths necessary for plant growth. In an alternate aspect of the invention, the walls of the inflatable structure can be made of a light filtering or opaque material for growing light-sensitive plants and animals, such as mushrooms or escargot. Another aspect of the invention is that the structure must provide sufficient thermal protection for the plants housed therein. Another aspect is that the structure must allow sufficient ventilation for temperature control and for circulating oxygen and carbon dioxide in adequate amounts to the plants within the structure. A fourth aspect is that the interior of the structure must be readily accessible for cultivating the plants or animals within the greenhouse. A fifth aspect is that the structure must be sufficiently stable and stationary to protect the plants enclosed without collapsing or blowing away in the event of strong winds or violent storms.

It is another object of the invention to provide a dome-shaped inflatable structure which is inexpensive to produce so that it can be priced to be accessible to homeowners and casual gardeners and not just to professionals. To accomplish this, the inflatable structure should be configured to be produced using simple manufacturing techniques and wherever possible to avoid costly manufacturing steps.

It is a further object of the invention to provide a dome-shaped inflatable structure which is entirely self-supporting and therefore does not require any rigid framework or supporting members.

In order to fulfill these objectives, the present invention takes the form of an approximately hemispherical dome-shaped inflatable greenhouse which is entirely self-supporting when inflated. The greenhouse has a double-walled structure which gives the greenhouse structural rigidity when inflated and which increases the thermal protection provided by the greenhouse. The walls of the greenhouse are made of a transparent or translucent plastic material to allow optimal light transmission for photosynthetic plants or of a light filtering or opaque plastic material for light-sensitive plants and animals. The greenhouse has an access door through the wall to allow easy access to the interior of the structure. The door is placed such that it does not interrupt the structural integrity of the inflated dome-shaped structure, therefore no rigid structural members are needed to support the walls. The slit-shaped access door is equipped with a slide fastener that can be opened from the top or the bottom so that the door can be used for ventilating the interior of the greenhouse as well as for interior access. Optionally, the inflatable greenhouse has a lower ring which is separately inflatable with a dense medium, such as water, for stabilizing and anchoring the greenhouse against movement by wind or storms.

The inflatable greenhouse is designed for low cost manufacturing. The double walled structure of the greenhouse can be formed of two sheets of plastic or a single blow molded plastic sphere. The inner and outer walls of the structure are spot welded together at numerous points in a pattern which lends to the structural rigidity of the greenhouse when inflated. In a particularly preferred embodiment of the invention, the spot welds are arranged so that the walls between the welds form interconnected triangular panels in the configuration of a geodesic dome. This configuration optimizes the structural rigidity of the inflated greenhouse. Inasmuch as possible, long linear or curved seams which would add to the manufacturing cost of the greenhouse are avoided. In its simplest configuration, the inflatable greenhouse requires only one linear seam in the entire structure at the point where the slide fastener for the access door will be installed. With the addition of the optional separately inflatable lower ring, the inflatable greenhouse requires only two long seams in the entire structure, with the rest of the structure formed by low cost, easy to form spot welds.

The inflatable greenhouse has an air inflation fitting connected to the double-walled dome structure and a water inflation fitting connected to the lower ring. Preferable, a pressure relief valve is also connected to the double-walled dome structure in the vicinity of the air inflation fitting to protect the structure from over inflation. Another pressure relief valve may be connected to the lower ring in the vicinity of the water inflation fitting to protect the lower ring from over inflation.

BRIEF DESCRIPTION OF THE DRAWINGS

FIG. 3 shows a cross section of the inflatable greenhouse taken along the line 3—3 in FIG. 2.

DETAILED DESCRIPTION OF THE INVENTION

Figure 1:
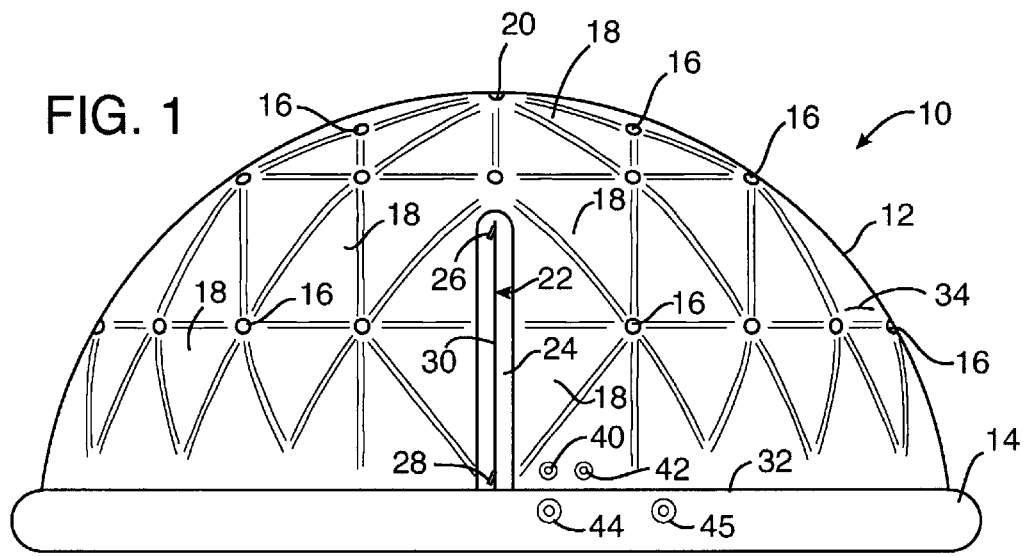
FIG. 1 shows a front elevation view of the inflatable greenhouse of the present invention.
Figure 2:
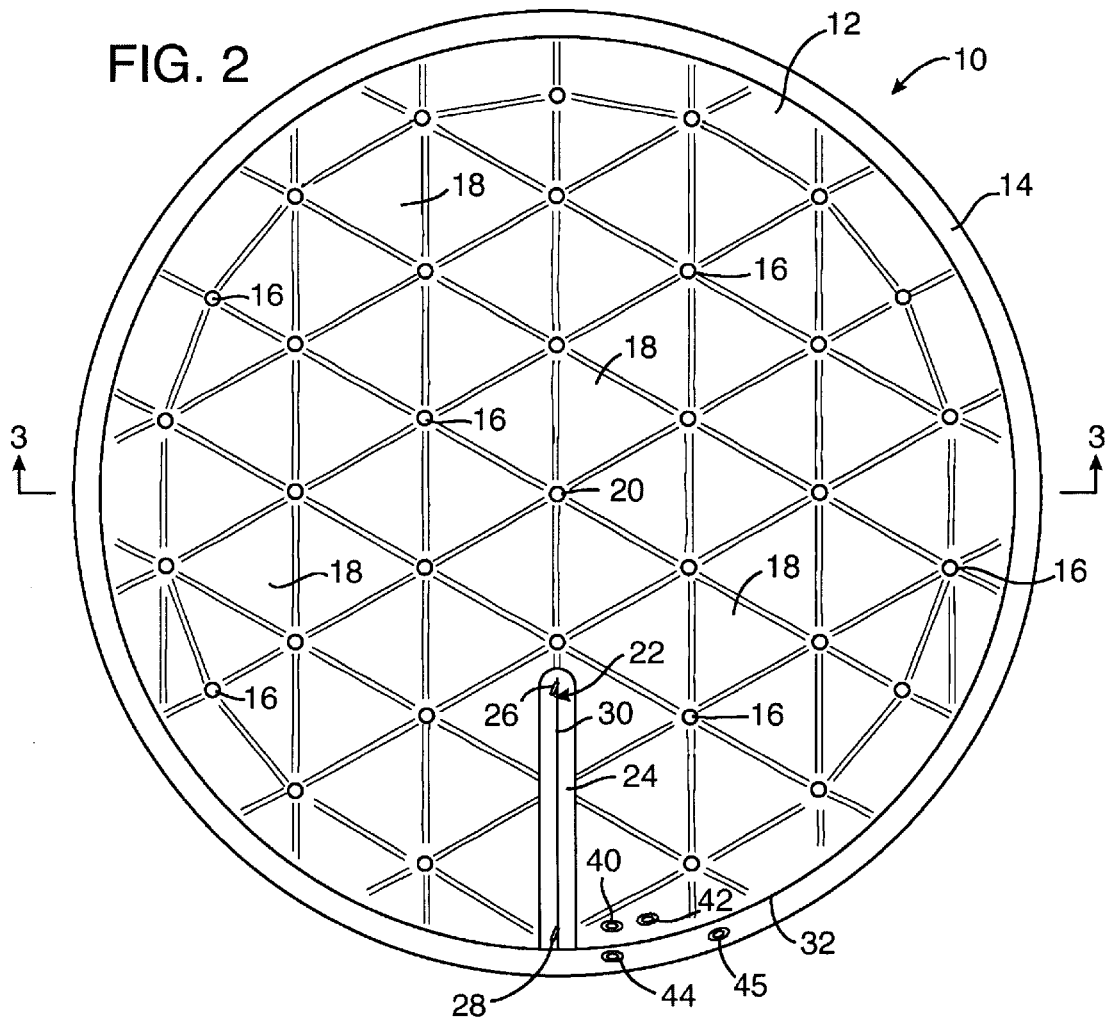
FIG. 2 shows a plan view of the inflatable greenhouse.

The inflatable greenhouse 10 of the present invention is shown in a front elevation view in FIG. 1 and in plan view in FIG. 2. The inflatable greenhouse 10 has a generally dome-shaped configuration. Preferably, the inflatable greenhouse 10 is approximately hemispherical in shape, although other shapes representing more or less than half of a sphere are possible, as are shapes representing an ovoid or ellipsoid volume. The diameter of the dome-shaped inflatable greenhouse 10 may vary from 4 feet up to approximately 30 feet, with a height at the center of the dome of approximately 2 feet to 15 feet. In one presently preferred embodiment, the inflatable greenhouse 10 has a diameter of approximately 15 feet, with a center height of approximately 7.5 feet. In this illustrative embodiment, the inflatable greenhouse 10 has an inflatable double-walled dome-shaped upper portion 12 and a separately inflatable ring-shaped lower portion 14. A circumferential welded seam 32 separates the dome-shaped upper portion 12 from the ring-shaped lower portion 14. The outer wall 34 and inner wall 36 (see FIG. 3) of the dome-shaped upper portion 12 are spot welded together at the apex 20 of the greenhouse 10 and at numerous points 16 throughout the walls in a pattern which lends to the structural rigidity of the greenhouse 10 when inflated. In a particularly preferred embodiment of the invention, the spot welds 16, 20 are arranged so that the walls between the welds 16, 20 form interconnected triangular panels 18 in the configuration of a geodesic dome. This configuration optimizes the structural rigidity of the inflated greenhouse 10.

The inflatable greenhouse 10 has an air inflation fitting 40 connected to the double-walled dome-shaped upper portion 12. The air inflation fitting 40 may be welded or adhesively attached to the wall 34 of the upper portion 12. The air inflation fitting 40 may be a Shrader-type inflation valve, as is commonly used on bicycle and automotive tires, to allow inflation by an air compressor, or it may be a larger diameter high-volume, low-pressure inflation fitting with a one-way valve to allow quicker inflation using a low pressure air source, such as a canister-type vacuum cleaner. Preferable, the inflatable greenhouse 10 also has a pressure relief valve 42 connected to the double-walled dome-shaped upper portion 12 in the vicinity of the air inflation fitting 40 to protect the structure from damage due to over inflation. The pressure relief valve 42 may be of the type which has a spring loaded ball which bears against a valve seat to seal a pressure relief orifice unless the pressure within the upper portion 12 of the greenhouse 10 exceeds a predetermined pressure. The predetermined relief pressure of the pressure relief valve 42 can vary somewhat depending on the size, material and construction of the greenhouse 10. In the currently preferred embodiment, the relief pressure is set at approximately 2 psi. A water inflation fitting 44 is connected to the ring-shaped lower portion 14 of the inflatable greenhouse 10. The water inflation fitting 44 may be threaded to connect to a standard garden hose connector and may also include a one-way valve and a cap. The water inflation fitting 44 may be welded or adhesively attached to the ring-shaped lower portion 14. Preferable, the inflatable greenhouse 10 also has a second pressure relief valve 45 connected to the ring-shaped lower portion 14 in the vicinity of the water inflation fitting 44 to protect the structure from damage due to over inflation with water. The pressure relief valve 45 may be of the type which has a spring loaded ball which bears against a valve seat to seal a pressure relief orifice unless the pressure within ring-shaped lower portion 14 of the greenhouse 10 exceeds a predetermined pressure. The predetermined relief pressure of the pressure relief valve 45 can vary somewhat depending on the size, material and construction of the greenhouse 10. In the currently preferred embodiment, the relief pressure is set at approximately 2 psi.

In the front wall of the greenhouse 10 there is a slit-shaped access door 22 into the interior of the greenhouse 10. The access door 22 has a slide fastener 30 which is surrounded by a wide welded seam 24 for strength. Preferably, the slide fastener 30 is a double-opening zipper, having an upper zipper slide 26 and a lower zipper slide 28 so that the fastener can be opened from the top or the bottom. This allows the interior of the greenhouse 10 to be ventilated to regulate the temperature within the greenhouse 10 by partially opening both the slide fastener 30 at the top and the bottom to establish a convention current. In a preferred embodiment, the slide fastener 30 is a plastic zip-lock type slide fastener with a backing that can be heat welded directly to the wall 34 of the greenhouse 10. This type of slide fastener 30 is preferred because it provides the access door 22 with a weather-proof seal when closed. Alternatively, the slide fastener 30 can be a toothed or coil-type plastic zipper or a toothed metal zipper and can be welded, sewn or adhesively bonded to the wall 34 of the greenhouse 10, depending on the material of the fastener backing.

FIG. 3 shows a cross section of the inflatable greenhouse 10 taken along the line 3—3 in FIG. 2. The inflatable greenhouse 10 has an outer wall 34 and an inner wall 36 which are spot welded together at the apex 20 of the greenhouse 10 and at numerous points 16 throughout the walls. The spot welds 16, 20 are preferably approximately 1 to 2 inches in diameter for sufficient and reliable strength. Between the spot welds 16, 20, the outer wall 34 and the inner wall 36 form a network of interconnected double-walled triangular panels 18 when inflated. The double-walled structure of the triangular panels 18 lends structural rigidity to the inflated greenhouse 10 and provides thermal isolation between the interior and the exterior of the greenhouse 10. In addition, the outer wall 34 and the inner wall 36 are sealed together by a circumferential welded seam 32 which separates the dome-shaped upper portion 12 of the greenhouse 10 from the ring-shaped lower portion 14. When the inflatable greenhouse 10 is intended for sheltering and cultivating photosynthetic plants, the outer wall 34 and the inner wall 36 are preferably constructed of a transparent or translucent flexible thermoplastic material. When the inflatable greenhouse 10 is intended for sheltering and cultivating light-sensitive plants and animals, such as mushrooms or escargot, the outer wall 34 or the inner wall 36 or both are preferably constructed of a light filtering or opaque flexible thermoplastic material. The outer wall 34 and the inner wall 36 have a thickness of approximately 0.002 to 0.010 inches, preferably approximately 0.004 to 0.008 inches. Suitable materials include, but are not limited to, polymers such as polyethylene, polypropylene, nylon, polyurethane, polyvinyl chloride, polyester, etc. In addition, fiber reinforced plastic materials could be used for improved strength. The spot welds 16, 20 and the welded seams 24, 32 of the greenhouse 10 are preferably made by heating and pressing the outer wall 34 and inner wall 36 together to fuse and weld them to one another. Alternatively, the spot welds 16, 20 and welded seams 24, 32 can be replaced by adhesive joints. The outer wall 34 and the inner wall 36 of the greenhouse 10 can be formed of one continuous sheet of plastic film or they may be formed from two separate sheets of plastic film, in which case different but compatible plastic materials can be used for the two walls. A preferred method of constructing the inflatable greenhouse 10 is described below by way of example.

The inflatable greenhouse 10 may be made starting with a clear or pigmented, blow molded plastic sphere, which is preferably about 15 feet in diameter. The sphere is deflated so that one half of the sphere inverts inside of the other half to form the inner wall 36 and the outer wall 34 of the greenhouse 10, respectively. A spot weld 20 approximately 1 to 2 inches in diameter is placed at the apex of the hemisphere to join the outer wall 34 and the inner wall 36 together. Then, additional spot welds 16 are placed approximately two and a half feet apart in a triangular pattern corresponding with the vertices of a geodesic dome. About a foot from the bottom edge of the hemisphere a continuous circumferential welded seam 32 is made to separate the dome-shaped upper portion 12 of the greenhouse 10 from the ring-shaped lower portion 14. The air inflation fitting 40 and the pressure relief valve 42 are welded or adhesively bonded to the outer wall 34 in the region of the dome-shaped upper portion 12 and the water inflation fitting 44 and the pressure relief valve 45 are welded or adhesively bonded to the outer wall 34 in the region of the ring-shaped lower portion 14. Starting above the circumferential welded seam 32 a vertical weld 24 is made approximately 4 inches wide and 6 feet long. The vertical weld is slit to within about an inch from the top and the bottom of the weld and a double-opening zip-lock type slide fastener 30 is welded or adhesively bonded in place. This completes the construction of the inflatable greenhouse 10. In use, the ring-shaped lower portion 14 is filled with water or another dense medium to anchor the inflatable greenhouse 10 in place and the dome-shaped upper portion 12 is inflated with air to erect the inflatable greenhouse 10.

In an alternative construction method, the inflatable greenhouse 10 can be made from two separate sheets of plastic film. Each of the sheets of plastic film is first thermoformed by pressure molding or vacuum molding into a hemispherical shape. The two hemispherical shapes are nested together to form the inner wall 36 and the outer wall 34 of the greenhouse 10. Then, a continuous circumferential welded seam is made along the lower edge of the hemisphere to join the inner wall 36 and the outer wall 34 together. The inflatable greenhouse 10 is then completed according to the steps described above.

I claim:

1. A self-supporting, inflatable dome greenhouse structure comprising:

a first substantially dome-shaped sheet of material having a peripheral edge, and a second substantially dome-shaped sheet of material having a peripheral edge, wherein said first substantially dome-shaped sheet of material and said second substantially dome-shaped sheet of material are made of a transparent plastic or polymeric sheet material, the peripheral edge of said first substantially dome-shaped sheet of material being sealed to the peripheral edge of said second substantially dome-shaped sheet of material to create an inflation chamber between said first substantially dome-shaped sheet of material and said second substantially dome-shaped sheet of material, said first substantially dome-shaped sheet of material being joined directly to said second substantially dome-shaped sheet of material at a multiplicity of attachment points to form a multiplicity of interconnected inflated panels upon inflation of the inflation chamber between said first substantially dome-shaped sheet of material and said second substantially dome-shaped sheet of material, wherein the multiplicity of attachment points are arranged in a triangular pattern defining a geodesic dome, having the multiplicity of interconnected inflated panels triangular shaped, upon inflation of the inflation chamber between said first substantially dome-shaped sheet of material and said second substantially dome-shaped sheet of material, an inflation fitting in fluid communication with said inflation chamber, an inflatable lower ring connected to the peripheral edge of said first substantially dome-shaped sheet of material and the peripheral edge of said second substantially dome-shaped sheet of material, wherein said lower ring is sealed from said inflation chamber and is separately inflatable therefrom, a second inflation fitting in fluid communication with said lower ring, a vertical slit-shaped access door through said first substantially dome-shaped sheet of material and said second substantially dome-shaped sheet of material into an interior space within the inflatable dome structure, the inflatable dome greenhouse structure having an open bottom thereby permitting cultivating and protecting pants within the inflatable dome greenhouse structure when inflated.

2. The inflatable dome structure of claim 1 wherein said first substantially dome-shaped sheet of material and said second substantially dome-shaped sheet of material are made of a plastic or polymeric sheet material chosen from the group consisting of polyethylene, polypropylene, nylon, polyurethane, polyvinyl chloride, polyester, and fiber reinforced plastic materials.

3. The inflatable dome structure of claim 1 wherein said inflation fitting further comprises a one way valve.

4. The inflatable dome structure of claim 3 further comprising a pressure relief valve being in fluid communication with said inflation chamber.

5. The inflatable dome structure of claim 1 wherein said access door has a double-opening zipper-type closure.

6. The inflatable dome structure of claim 1 wherein said second inflation fitting further comprises a one way valve.

7. The inflatable dome structure of claim 6 further comprising a second pressure relief valve being in fluid communication with said lower ring.

8. The inflatable dome structure of claim 1 wherein said second inflation fitting is configured for attachment to a water hose.

9. The inflatable dome structure of claim 1 wherein, upon inflation of the inflation chamber, the inflatable dome structure has a diameter of approximately 4 to 30 feet and a height of approximately 2 to 15 feet.

10. The inflatable dome structure of claim 1 wherein, upon inflation of the inflation chamber, the inflatable dome structure has a diameter of approximately 15 feet and a height of approximately 7.5 feet.

11. The inflatable dome structure of claim 1 wherein said first substantially dome-shaped sheet of material and said second substantially dome-shaped sheet of material have a thickness of approximately 0.002 to 0.010 inches.

12. The inflatable dome structure of claim 1 wherein said first substantially dome-shaped sheet of material and said second substantially dome-shaped sheet of material have a thickness of approximately 0.004 to 0.008 inches.

13. The inflatable dome structure of claim 1 wherein said first substantially dome-shaped sheet of material and said second substantially dome-shaped sheet of material are parts of a continuous generally spherical sheet and wherein said peripheral edges are created by inverting one of said first and said second substantially dome-shaped sheets of material into the other of said first and second substantially dome-shaped sheets of material.

* * * * *